United States Patent
Izzo et al.

(10) Patent No.: US 12,124,833 B2
(45) Date of Patent: Oct. 22, 2024

(54) TECHNIQUES FOR MANAGING OFFLINE IDENTITY UPGRADES

(71) Applicant: Micron Technology, Inc., Boise, ID (US)

(72) Inventors: Niccolo Izzo, Vignate (IT); Alessandro Orlando, Milan (IT); Danilo Caraccio, Milan (IT); David Hulton, Seattle, WA (US)

(73) Assignee: Micron Technology, Inc., Boise, ID (US)

( * ) Notice: Subject to any disclaimer, the term of this patent is extended or adjusted under 35 U.S.C. 154(b) by 74 days.

(21) Appl. No.: 17/744,350

(22) Filed: May 13, 2022

(65) Prior Publication Data

US 2023/0367575 A1    Nov. 16, 2023

(51) Int. Cl.
*G06F 8/65*      (2018.01)
*H04L 9/08*      (2006.01)

(52) U.S. Cl.
CPC .............. *G06F 8/65* (2013.01); *H04L 9/088* (2013.01)

(58) Field of Classification Search
CPC ................................ G06F 8/65; H04L 9/088
USPC .................................................. 717/120–178
See application file for complete search history.

(56) References Cited

U.S. PATENT DOCUMENTS

| | | | | |
|---|---|---|---|---|
| 2011/0061046 A1* | 3/2011 | Phillips | ............... | G06F 9/45533 717/176 |
| 2012/0089839 A1* | 4/2012 | Qiu | .................... | H04L 9/0891 713/168 |
| 2014/0215555 A1* | 7/2014 | Barton | ................ | G06F 9/45533 726/1 |
| 2016/0232116 A1* | 8/2016 | Bone | ..................... | H04W 88/06 |
| 2021/0117578 A1* | 4/2021 | Cheruvu | ................ | G06F 21/85 |
| 2021/0150013 A1* | 5/2021 | Duval | ................... | H04L 9/0643 |
| 2022/0116289 A1* | 4/2022 | Ramanathan | ....... | H04L 41/5051 |
| 2022/0222348 A1* | 7/2022 | Vaswani | ............... | H04L 9/0825 |

OTHER PUBLICATIONS

Xu, Meng, et al. "Dominance as a new trusted computing primitive for the internet of things." 2019 IEEE Symposium on Security and Privacy (SP). IEEE, 2019.pp.1415-1430 (Year: 2019).*

Kreutz, Diego, et al. "Software-defined networking: A comprehensive survey." Proceedings of the IEEE 103.1 (2014): pp. 14-76. (Year: 2014).*

(Continued)

*Primary Examiner* — Satish Rampuria
(74) *Attorney, Agent, or Firm* — Holland & Hart LLP

(57) ABSTRACT

Methods, systems, and devices for techniques for managing offline identity upgrades are described. A memory system may receive a command to update a device identifier for a device identifier composition engine (DICE) associated with the memory system. The memory system may generate an updated device identifier, at a first software layer of a set of software layers of the DICE, based on receiving the command. The memory system may decrypt a device specific key (DSK) stored at a read-only memory device of the memory system based on the received command, and sign the updated device identifier using the DSK based on decrypting the DSK. The memory system may execute one or more operations associated with the first software layer of the set of software layers of the DICE based on the signed updated device identifier.

35 Claims, 9 Drawing Sheets

(56) References Cited

OTHER PUBLICATIONS

Al-Fuqaha, Ala, et al. "Internet of things: A survey on enabling technologies, protocols, and applications." IEEE communications surveys & tutorials 17.4 (2015): pp. 2347-2376. (Year: 2015).*

Chawla, Nikhil, et al. "Securing iot devices using dynamic power management: Machine learning approach." IEEE Internet of Things Journal 8.22 (2020): pp. 16379-16394. (Year: 2020).*

Chaabouni, Nadia, et al. "Network intrusion detection for IoT security based on learning techniques." IEEE Communications Surveys & Tutorials 21.3 (2019): pp. 2671-2701. (Year: 2019).*

Padekar, Hitesh, et al. "Enabling dynamic access control for controller applications in software-defined networks." Proceedings of the 21st ACM on Symposium on Access Control Models and Technologies. 2016. pp. 51-61. (Year: 2016).*

* cited by examiner

TECHNIQUES FOR MANAGING OFFLINE IDENTITY UPGRADES

FIELD OF TECHNOLOGY

The following relates to one or more systems for memory, including techniques for managing offline identity upgrades.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

Figure 1:
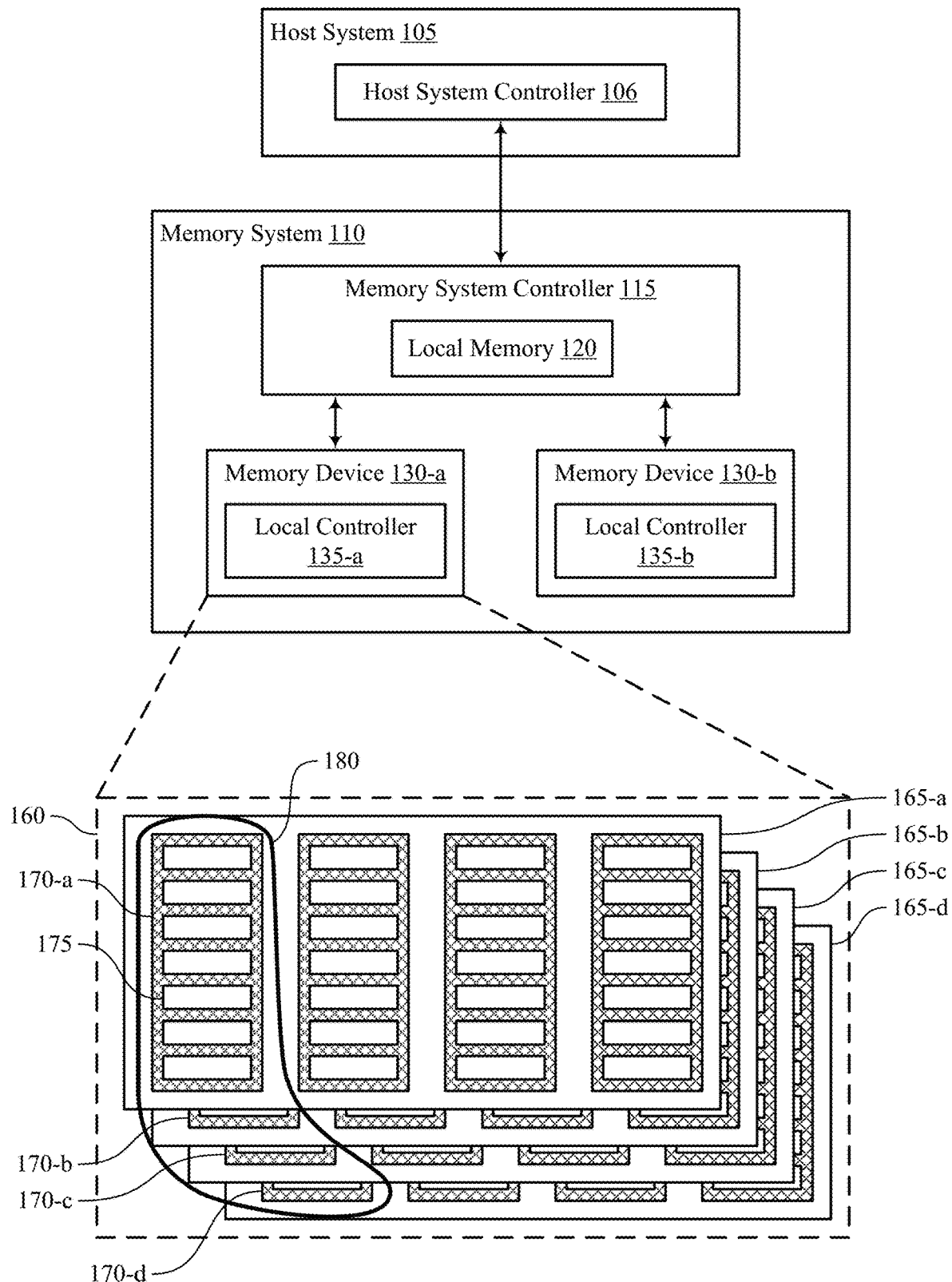
FIG. 1 illustrates an example of a system that supports techniques for managing offline identity upgrades in accordance with examples as disclosed herein.

A memory device may support various operations and may be operable to receive, transmit, or execute commands, data, or control information related to components of the memory device. The memory device may be configured with a device identifier composition engine (DICE) to enhance secure operations at the memory device for receiving, transmitting, or executing commands, data, or control information related to components of the memory device. For example, the memory device may use the DICE to execute a command to update a firmware associated with the memory device. In some cases, as part of the updating the firmware, the memory device may validate the firmware through a chain of trust (CoT). The CoT may establish a validation for the firmware by verifying a number of certificates (also referred to as digital certificates) associated with the firmware.

The DICE may include multiple software layers (also referred to as DICE layers), including a Layer 0 and a Layer 1. In the CoT, the DICE may be a root of trust (RoT). The RoT associated with the CoT may include a root certificate authority (CA). A root certificate associated with the root CA may be a certificate associated with the CA. The CoT may terminate with the RoT. The root certificate may be signed by the root CA. Each certificate of the number of certificates in the CoT may be signed by an entity identified by a subsequent certificate in the CoT, and each signature of each certificate of the number of certificates in the CoT may be verified up to the root certificate associated with the root CA. As such, from the root certificate, the memory device may verify that a last certificate (also referred to as leaf certificate) in the CoT is trustworthy. A leaf certificate may be an example of a certificate that does not sign other certificates in the CoT.

A device identity (ID) may be associated with the Layer 0 of the DICE. The device ID may be an asymmetric key pair that authenticates a combination of hardware and firmware as described herein. The Layer 0 may be mutable (e.g., changeable). The DICE may use the CoT to associate a device ID certificate to the root CA. The device ID certificate may be signed by a server associated with a manufacturer of the memory device. As described herein, after deployment of the memory device, the memory device may execute a command to update a firmware associated with the memory device. For example, the memory device may execute a command to update the Layer 0 associated with the DICE (e.g., to fix code bugs, or the like). During the update of the Layer 0, the Layer 0 may update (e.g., change) the device ID.

The update to the device ID by the Layer 0 may result in a disruption to the CoT. For example, when the Layer 0 is implemented with mutable code and updated, the device ID key pair may change, and a new self-signed certificate may be generated, disrupting the CoT. As a result, a new device ID certificate might be issued by the root CA to restore the CoT for the memory device. To be issued the new device ID certificate, the memory device may transmit a certificate signing request (CSR) to the server (e.g., associated with the manufacturer of the memory device). However, some original equipment manufacturers (OEMs) may not support issuing of new device IDs to memory devices that experience disrupted CoT. Therefore, it may be desirable to enhance secure operations at the memory device by restoring a CoT at the memory device.

Various aspects of the present disclosure relate to a memory device configured with a set of keys, including a device specific key (DSK) and a device specific wrap key (DSWK) to support restoring a CoT when updating a firmware associated with the memory device. The DSK may be an example of an asymmetric key pair, while the DSWK may be an example of a symmetric key. The memory device may randomly generate the DSK, for example, based on a unique device secret (UDS) associated with the memory device. The UDS may be a statistically unique, device-specific, secret value. The UDS may be generated externally and installed during manufacture or generated internally during device provisioning. The UDS may be stored in nonvolatile memory on the memory device. The DICE may restrict access to the nonvolatile memory storing the UDS, and thereby enhance the security for the CoT. The DSK may also be encrypted using the DSWK. In some examples, a server (e.g., associated with the manufacturer of the memory device) or the memory device, or both, may randomly generate the DSWK and inject it into the memory device. Additionally, the memory device may be configured with a device specific certificate (DSC) to support restoring the CoT when updating the firmware associated with the memory device. The DSC may be shared with the server or a host device, or both, as part of the CoT.

Additionally, the memory device may store the DSK in a ROM, such as a programmable fuse (e.g., an electronic fuse (eFuse) or an anti-fuse), or in a physical unclonable function (PUF) based storage. In some examples, the DSK may be revokable, for example, removed from memory (e.g., eFuse) or storing a revocation flag in a secure storage in case the key is stored in a ROM of the memory device. Additionally, the memory device may retrieve the DSWK from nonvolatile memory, such as ROM, erasable programmable ROM (EPROM), electrically erasable programmable ROM (EEPROM), ferroelectric random-access memory (FeRAM), magnetic random-access memory (MRAM), phase-change memory (PCM), or a combination thereof. With reference to the above example relating to the update of the firmware associated with the memory device, when the update to the firmware results in an update to the device ID, the memory device may sign the updated device ID using the DSK. For example, the memory device may decrypt the DSK stored in ROM of the memory device using the DSWK, and may sign the device ID certificate using the DSK. As a result, the CoT is uninterrupted.

Features of the disclosure are initially described in the context of systems with reference to FIG. 1. Features of the disclosure are described in the context of a DICE architecture, a CoT, and methods with reference to FIGS. 2-6. These and other features of the disclosure are further illustrated by and described in the context of an apparatus diagram and flowchart that relate to techniques for managing offline identity upgrades with reference to FIGS. 7-9.

FIG. 1 illustrates an example of a system 100 that supports techniques for managing offline identity upgrades in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), or a compute express link (CXL) peripheral, among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller or CXL controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface or CXL interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130, or other operations associated with the memory device 130, including other memory expansion modules and future expansion modules not explicitly mentioned herein.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include ROM or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-*a*, 170-*b*, 170-*c*, and 170-*d* that are within planes 165-*a*, 165-*b*, 165-*c*, and 165-*d*, respectively, and blocks 170-*a*, 170-*b*, 170-*c*, and 170-*d* may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wear out considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The system 100 may include any quantity of non-transitory computer readable media that support techniques for managing offline identity upgrades. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

One or both of the host system 105 or the memory system 110 may be configured with a DICE to support secure operations at one or both of the host system 105 or the memory system 110. For example, one or both of the host system 105 or the memory system 110 may support a DICE architecture as described with reference to FIG. 2. An example of an operation at one or both of the host system 105 or the memory system 110 may include an update to firmware, software, or hardware, or any combination thereof. For example, one or both of the host system 105 or the memory system 110 may receive a command to update a device ID for a DICE associated with one or both of the host system 105 or the memory system 110. One or both of the host system 105 or the memory system 110 may generate an updated device ID, at a first software layer (e.g., a Layer 0) of a set of software layers of the DICE.

As part of updating the firmware, one or both of the host system 105 or the memory system 110 may validate the firmware through a CoT. To support restoring the CoT when updating the firmware, one or both of the host system 105 or the memory system 110 may be configured with a set of keys, including a DSK and a DSWK. As described herein, the DSK may be encrypted using the DSWK. One or both the DSK and DSWK may be specific to one or both of the host system 105 or the memory system 110. Additionally, one or both of the host system 105 or the memory system 110 may be configured with a DSC to support restoring the CoT when updating the firmware.

One or both of the host system 105 or the memory system 110 may decrypt the DSWK stored in a ROM (e.g., a memory die 160 or a silicon mask) of the memory system 110. One or both of the host system 105 or the memory system 110 may then sign the updated device ID using the decrypted DSK. In some examples, one or both of the host system 105 or the memory system 110 may sign the DSC using decrypted DSK. One or both of the host system 105 or the memory system 110 may proceed to execute the first software layer (e.g., the Layer 0) of the DICE based on the signed updated device ID. By enabling one or both of the host system 105 or the memory system 110 to sign a device ID certificate using the DSK, one or both of the host system 105 or the memory system 110 may maintain or restore the CoT without requesting an OEM associated with one or both of the host system 105 or the memory system 110 to issue a device ID.

Figure 2:
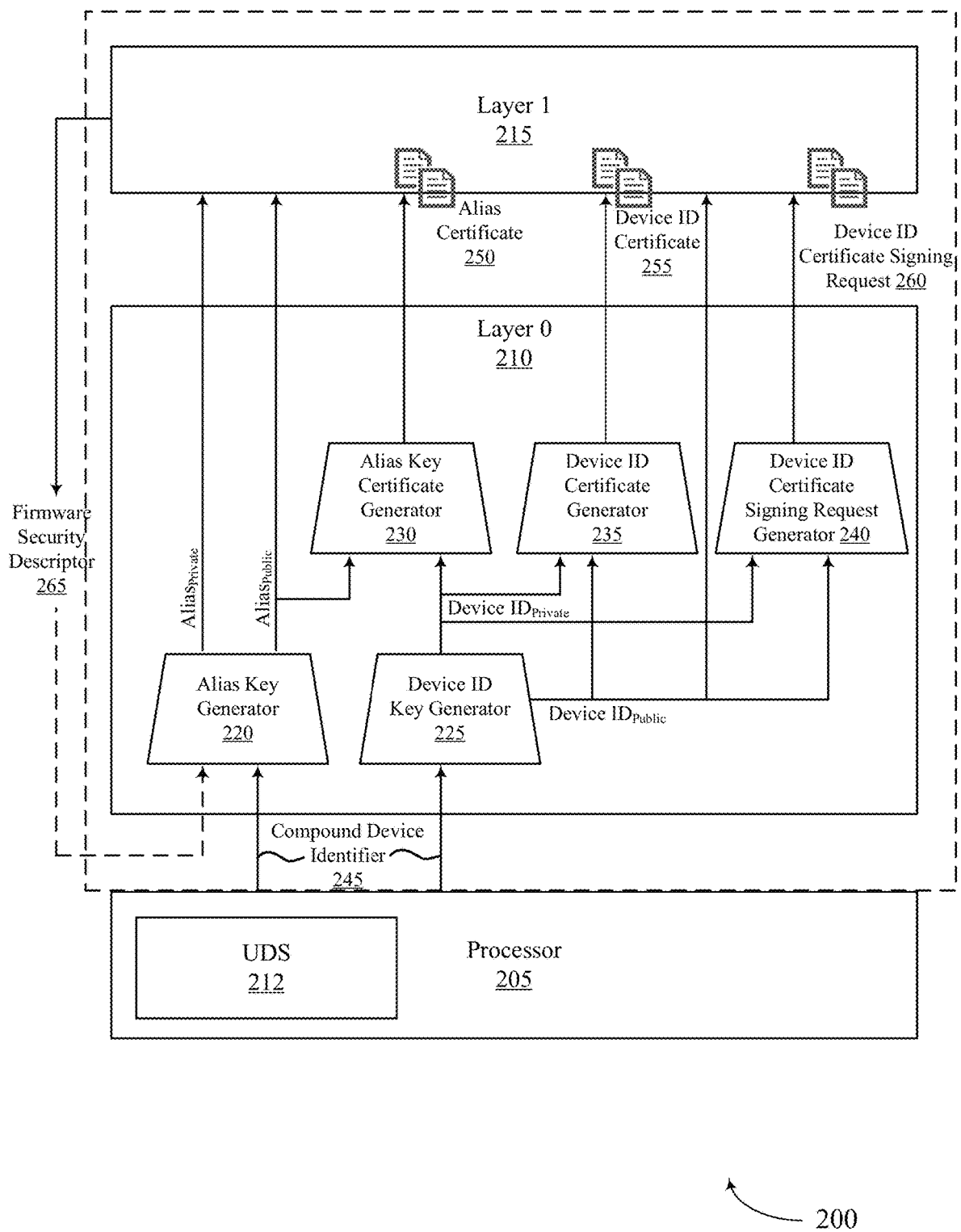
FIG. 2 illustrates an example of a device identifier composition engine (DICE) architecture that supports techniques for managing offline identity upgrades in accordance with examples as disclosed herein.

FIG. 2 illustrates an example of a DICE architecture 200 that supports techniques for managing offline identity upgrades in accordance with examples as disclosed herein. The DICE architecture 200 may implement or be implemented by aspects of the system 100. For example, the DICE architecture 200 may be implemented by one or both of a host system 105 or a memory system 110 as described with reference to FIG. 1. The DICE architecture 200 may include a processor 205 and a set of software layers, including a first software layer 210 (referred to as a Layer 0) and a second software layer 215 (referred to as a Layer 1). These components may be in electronic communication or otherwise coupled (e.g., operatively, communicatively, functionally, electronically, electrically).

The processor 205 may include an intelligent hardware device (e.g., a central processing unit (CPU) configured as or otherwise supporting a means for performing the functions described herein). In some examples, the processor 205 and a memory system (not shown) coupled with the processor 205 may be configured to perform one or more of the functions described herein (for example, by executing, by the processor 205, instructions stored in the memory system (not shown)). The processor 205 may include a UDS 212. The first software layer 210 may include one or more components including an alias key generator 220, a device ID key generator 225, an alias key certificate generator 230, a device ID certificate generator 235, and a device ID CSR generator 240. In the example of FIG. 2, the first software layer 210 (i.e., the Layer 0) and the second software layer 215 (i.e., the Layer 1) may be executable code by the processor 205.

The DICE architecture 200 may support authentication and secure communications at one or both of the host system 105 or the memory system 110. In some examples, the DICE architecture 200 may support authentication and secure communications at one or both of the host system 105 or the memory system 110 using a Secure Protocol and Data Model (SPDM) session, a Transport Level Security (TLS) session, or some combination thereof, using one or more certificates. The DICE architecture 200 may support hardware-based cryptographic device identity, attestation, and data encryption. The DICE architecture 200 may support provisioning or generating an asymmetric key pair referred to as device ID keys. OEMs may enable the device ID keys to change (e.g., during remanufacture, or using other cryptographic protocols). The DICE architecture 200 may also support generating or provisioning other keys, such as alias keys as described herein. In contrast to the device ID credentials, which do not change, new alias keys may be generated with a higher frequency (e.g., more often), such as during an update of a firmware associated with one or both of the host system 105 or the memory system 110.

The processor 205 may generate and output a compound device identity (CDI) 245 to the first software layer 210 (i.e., the Layer 0). In some examples, to generate the CDI 245, the processor 205 may hash the UDS 212 with a hash of the first software layer 210. The CDI 245 may be a secret value that may be unique to one or both of the host system 105 or the memory system 110. The first software layer 210 (i.e., the Layer 0) may use the CDI 245 to generate one or both of private or public keys. The alias key generator 220 may generate an alias key pair based in part on the CDI 245. In some examples, the alias key generator 220 may generate the alias key pair using a deterministic key generation function. The alias key pair may include an alias public key and an alias private key. The alias key generator 220 may output one or both of the alias public key or an alias private key to the second software layer 215 (i.e., the Layer 1). As such, the processor 205 may link the CDI 245 to the UDS 245, and hash a first mutable code layer (e.g., one or more of the software layers).

Additionally or alternatively, the alias key generator 220 may generate an alias key pair based in part on a firmware security descriptor (FSD) 265. The second software layer 215 (i.e., the Layer 1) may output the FSD 265 to the first software layer (i.e., the Layer 0). The FSD 265 may be a data structure identifying an identity associated with the second software layer 215 (i.e., the Layer 1). Examples of the FSD 265 include a firmware image of the second software layer 215 (i.e., the Layer 1), a firmware version associated with one or both of the first software layer 210 (i.e., the Layer 0) or the second software layer 215 (i.e., the Layer 1). In some examples, If the FSD 265 is invalid or missing, the alias key generator 220 may abort key generation.

The device ID key generator 225 may generate an asymmetric device ID key pair based in part on the CDI 245. In some examples, the device ID key generator 225 may generate an asymmetric device ID key pair using a deterministic key generation function. The asymmetric device ID key pair may include a device ID private key and a device ID public key. The device ID key generator 225 may output the device ID public key to the second software layer 215 (i.e., the Layer 1). The alias key certificate generator 230 may generate and output an alias certificate 250 to the second software layer 215 (i.e., the Layer 1). In some examples, the alias key certificate generator 230 may generate the alias certificate 250 based in part on the alias public key and sign the alias certificate 250 using the device ID private key. The device ID certificate generator 235 may generate and output a device ID certificate 255 to the second software layer 215 (i.e., the Layer 1). In some examples, the device ID certificate generator 235 may generate the device ID certificate 255 based in part on the device ID public key and sign the device ID certificate 255 using the device ID private key. The device ID CSR generator 240 may generate the device ID CSR 260 based in part on the device ID public key and sign the device ID CSR 260 using the device ID private key.

Accordingly, the DICE architecture 200 may support secure operations at one or both of the host system 105 or the memory system 110. For example, one or more components of the DICE architecture 200 may receive a command to update a device ID associated with one or both of the host system 105 or the memory system 110. One or more components of the DICE architecture 200 may generate an updated device ID, at the first software layer 210 (e.g., the Layer 0) of the DICE architecture 200. As part of updating the firmware, one or more components of the DICE architecture 200 may validate the firmware through a CoT. To support restoring the CoT when updating the firmware, one or more components of the DICE architecture 200 may be configured with a set of keys, including a DSK and a DSWK. As described herein, the DSK may be encrypted using the DSWK. One or both the DSK and DSWK may be specific to one or both of the host system 105 or the memory system 110. Additionally, one or more components of the DICE architecture 200 may be configured with a DSC to support restoring the CoT when updating the firmware.

One or more components of the DICE architecture 200 may decrypt the DSK of the memory system 110. One or more components of the DICE architecture 200 may then sign the updated device ID using the decrypted DSK. In some examples, one or more components of the DICE architecture 200 may sign the DSC using decrypted DSK. One or more components of the DICE architecture 200 may proceed to execute the first software layer 210 (e.g., the Layer 0) of the DICE architecture 200 based on the signed updated device ID. By enabling one or more components of the DICE architecture 200 to sign a device ID certificate using the DSK, the DICE architecture 200 may maintain or restore the CoT without requesting an OEM associated with one or both of the host system 105 or the memory system 110 to issue a device ID.

Figure 3:
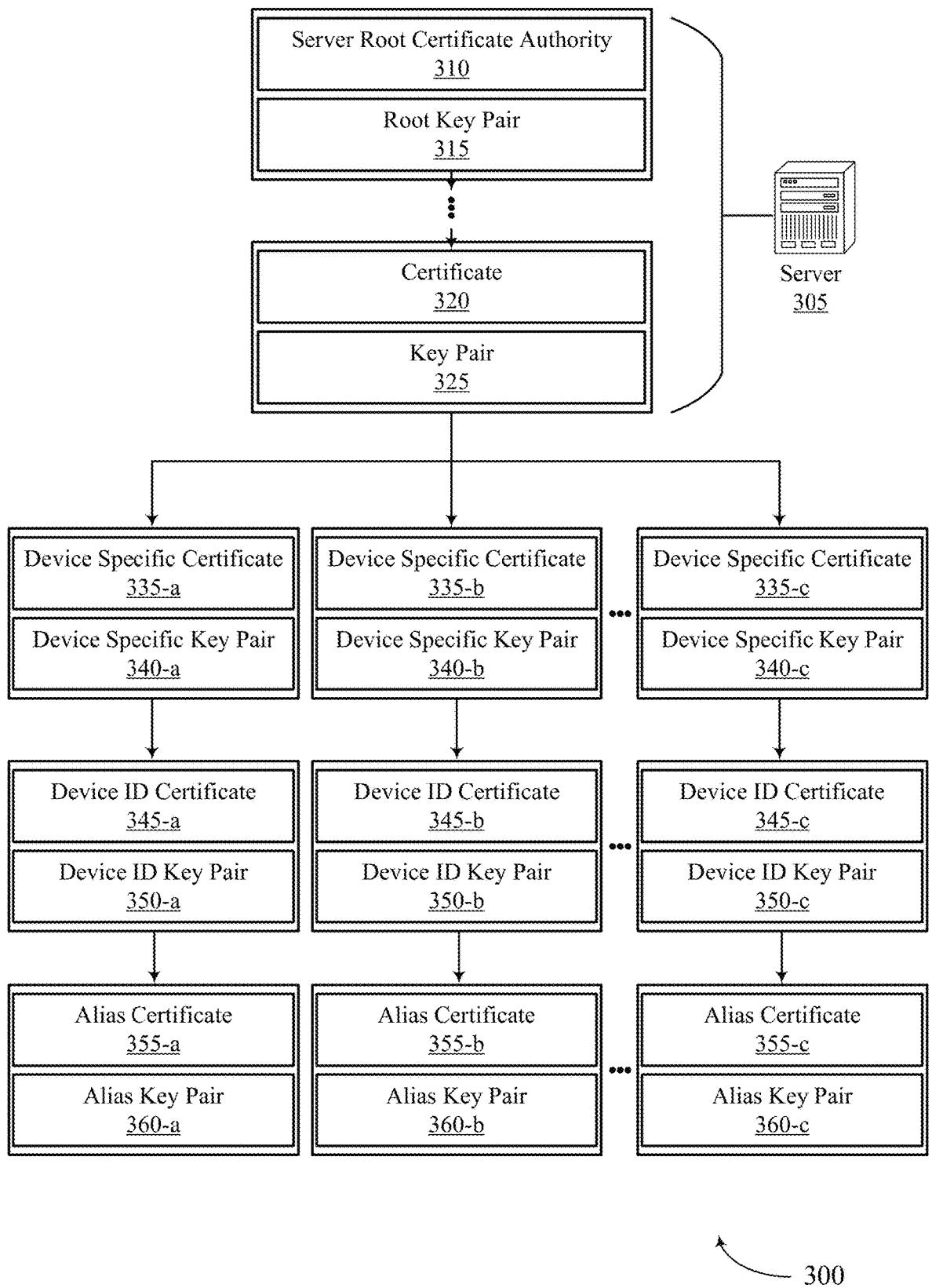
FIG. 3 illustrates an example of a chain of trust (CoT) that supports techniques for managing offline identity upgrades in accordance with examples as disclosed herein.

FIG. 3 illustrates an example of a CoT method 300 that supports techniques for managing offline identity upgrades in accordance with examples as disclosed herein. The CoT method 300 may implement or be implemented by aspects of the system 100. For example, the CoT method 300 may be implemented by one or both of a host system 105 or a memory system 110 as described with reference to FIG. 1. In some examples, the CoT method 300 may be implemented by a server 305. The server 305 may be associated with a manufacturer of one or both of the host system 105 or the memory system 110. In some examples, some operations may be omitted from the CoT method 300, and other operations may be added to the CoT method 300.

The server 305 may provision a set of devices, including the host system 105 with a CoT including a sequence of certificates, which embed one or more public keys used to validate them together with a public key of the root CA that acts as an anchor for the CoT. The server 305 may provision a set of devices, including one or both of the host system 105 or the memory system 110 with a root key pair 315. Additionally, the server 305 may provision a set of devices, including one or both of the host system 105 or the memory system 110 with a certificate 320 and a key pair 325. In the example of FIG. 3, one or more of the server root CA 310, the root key pair 315, the certificate 320, or the key pair 325 may be common to the set of devices, including one or both of the host system 105 or the memory system 110.

In the CoT method 300, each device of the set of devices may be associated with a respective DSC 335 and a DSK pair 340. For example, a first device may be associated with a first DSC 335-*a* and a first DSK pair 340-*a*, a second device may be associated with a second DSC 335-*b* and a second DSK pair 340-*b*, and a third device may be associated with a third DSC 335-*c* and a third DSK pair 340-*c*. Additionally, in the CoT method 300, each device of the set of devices may be associated with a respective device ID certificate 345 and a device ID key pair 350. For example, the first device may be associated with a first device ID certificate 345-*a* and a first device ID key pair 350-*a*, a second device may be associated with a second device ID certificate 345-*b* and a second device ID key pair 350-*b*, and a third device may be associated with a third device ID certificate 345-*c* and a third device ID key pair 350-*c*. Additionally, in the CoT method 300, each device of the set of devices may be associated with a respective alias certificate 355 and an alias key pair 360. For example, the first device may be associated with a first alias certificate 355-*a* and a first alias key pair 360-*a*, a second device may be associated with a second alias certificate 355-*b* and a second alias key pair 360-*b*, and a third device may be associated with a third alias certificate 355-*c* and a third alias key pair 360-*c*.

One or more of the respective DSC 335, the respective DSK pair 340, the respective device ID certificate 345, the respective device ID key pair 350, the respective alias certificate 355, or the alias key pair 360 may device-specific and downloadable by each device via a SPDM. In the example of FIG. 3, a respective DSC may be stored at each device of the set of devices. Additionally, a respective DSK associated with each device of the set of devices may be stored and encrypted in a secure environment, such as a programmable fuse (e.g., eFuse). The key pair 325 may be kept within the server boundary of the server 305. By enabling one or more operations of the CoT method 300 to sign a device ID certificate using the DSK, the CoT method 300 may maintain or restore the CoT without requesting an OEM associated with one or both of the host system 105 or the memory system 110 to issue a device ID.

Figure 4:
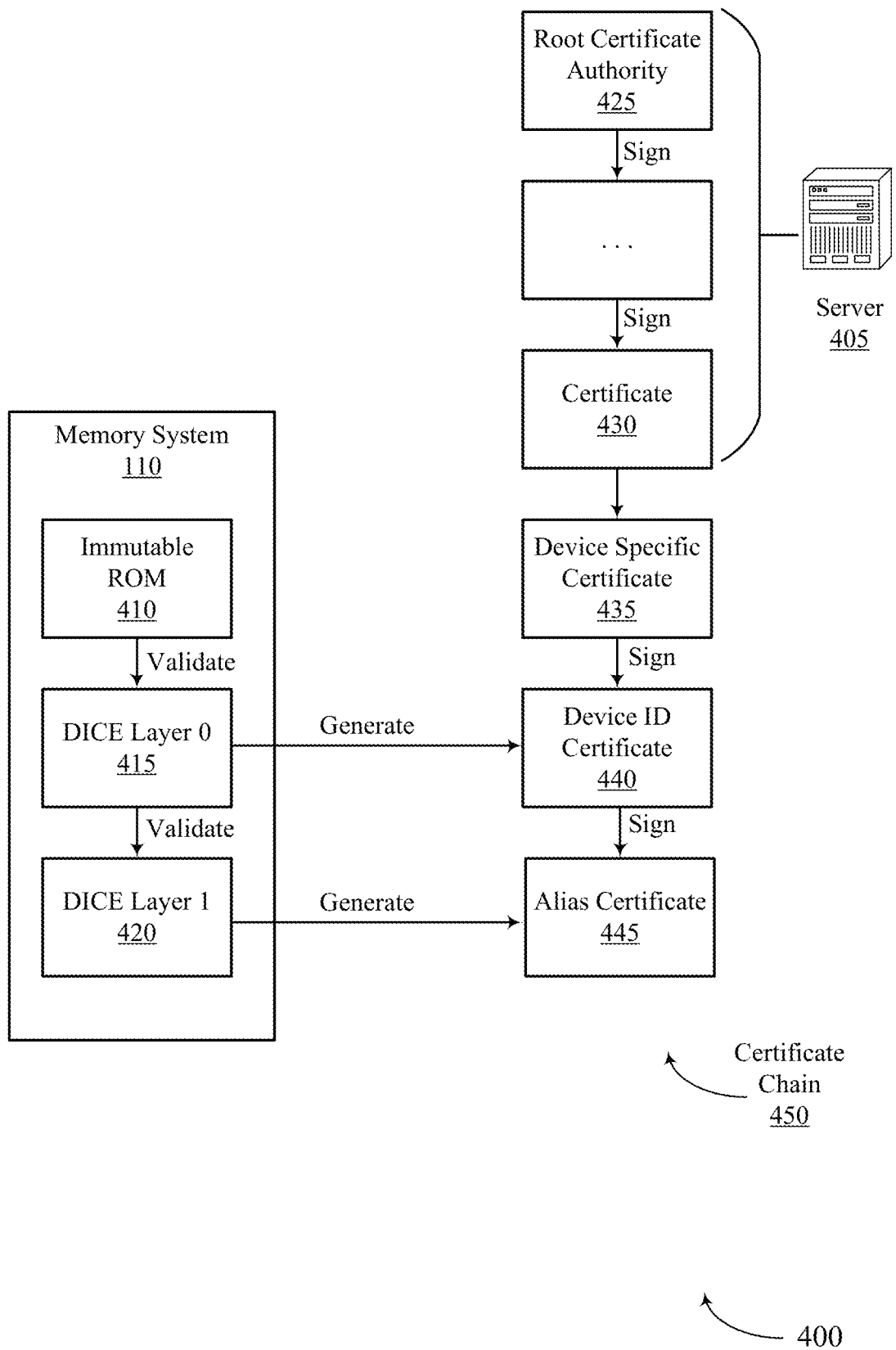
FIG. 4 illustrates an example of a signing method that supports techniques for managing offline identity upgrades in accordance with examples as disclosed herein.

FIG. 4 illustrates an example of a signing method 400 that supports techniques for managing offline identity upgrades in accordance with examples as disclosed herein. The signing method 400 may implement or be implemented by aspects of the system 100. For example, the signing method 400 may be implemented by a memory system 110 as described with reference to FIG. 1. In some examples, the signing method 400 may be implemented by a server 405. The server 405 may be associated with a manufacturer of the memory system 110. In some examples, some operations may be omitted from the signing method 400, and other operations may be added to the signing method 400. As part of deployment of the memory system 110, the server 405 may sign a device ID certificate associated with the memory system 110. In some cases, after deployment of the memory system 110, the server 405 may be unable to sign (or re-sign) the device ID certificate associated with the memory system 110.

The memory system 110 may include immutable ROM 410, which may store executable code including one or more keys (e.g., DSK, DWSK, or the like). The memory system 110 may include a memory. The memory may be a nonvolatile memory, for example, ROM, EPROM, EEPROM, FeRAM, MRAM, PCM, or a combination thereof. Additionally, or alternatively, the memory may be a volatile memory device, for example, a DRAM or a SRAM. The memory system 110 may be configured with a DICE, including a DICE layer 0 415 and a DICE layer 1 420. The server 405 may generate a set of certificates including a certificate 430, which may be signed by one or more previous certificates including a root certificate associated with a root CA 425. The memory system 110 may be associated with a DSC 435, which may sign a device ID certificate 440. The device ID certificate 440 may sign an alias certificate 445.

Updating a device ID may disrupt the CoT. For example, the device ID for the DICE system is bound to DICE Layer 0. The DICE system may use the CoT to bind the device ID with the root CA. In such examples, if the device ID is changed, it may break the CoT because the device ID certificate associated with the new device ID may be invalid. For instance, the device ID certificate may be associated with the old device ID and not the new device ID. In many systems, the device ID certificate can be issued by a remote server during a manufacturing process. To ensure secure transmission the device ID certificate may typically be communicated using a direct connection during a manufacturing process. In many instances such a connection is not possible after the product has been deployed. Thus, other solutions for update the CoT for a new device ID in a DICE system may be useful.

In the example of FIG. 4, the memory system 110 may support maintaining or restoring a CoT by executing one or more operations associated with a certificate chain 450. For example, the memory system 110 may support maintaining or restoring a CoT by signing the device ID certificate 440 using a DSK as described herein. The memory system 110 may retrieve the DSK from the memory, which may be a programmable fuse (e.g., eFuse). Additionally, or alternatively, the memory system 110 may retrieve a DSWK from the memory, which may be a nonvolatile memory, such as a ROM. The memory system 110 may decrypt the DSK (e.g., a private DSK of the memory system 110) using the DSWK. Subsequently, the memory system 110 may sign the device ID certificate 440 using the DSK based on decrypting the DSK. By signing the device ID certificate 440 using the DSK (e.g., a private DSK of the memory system 110), the CoT may be conserved.

Figure 5:
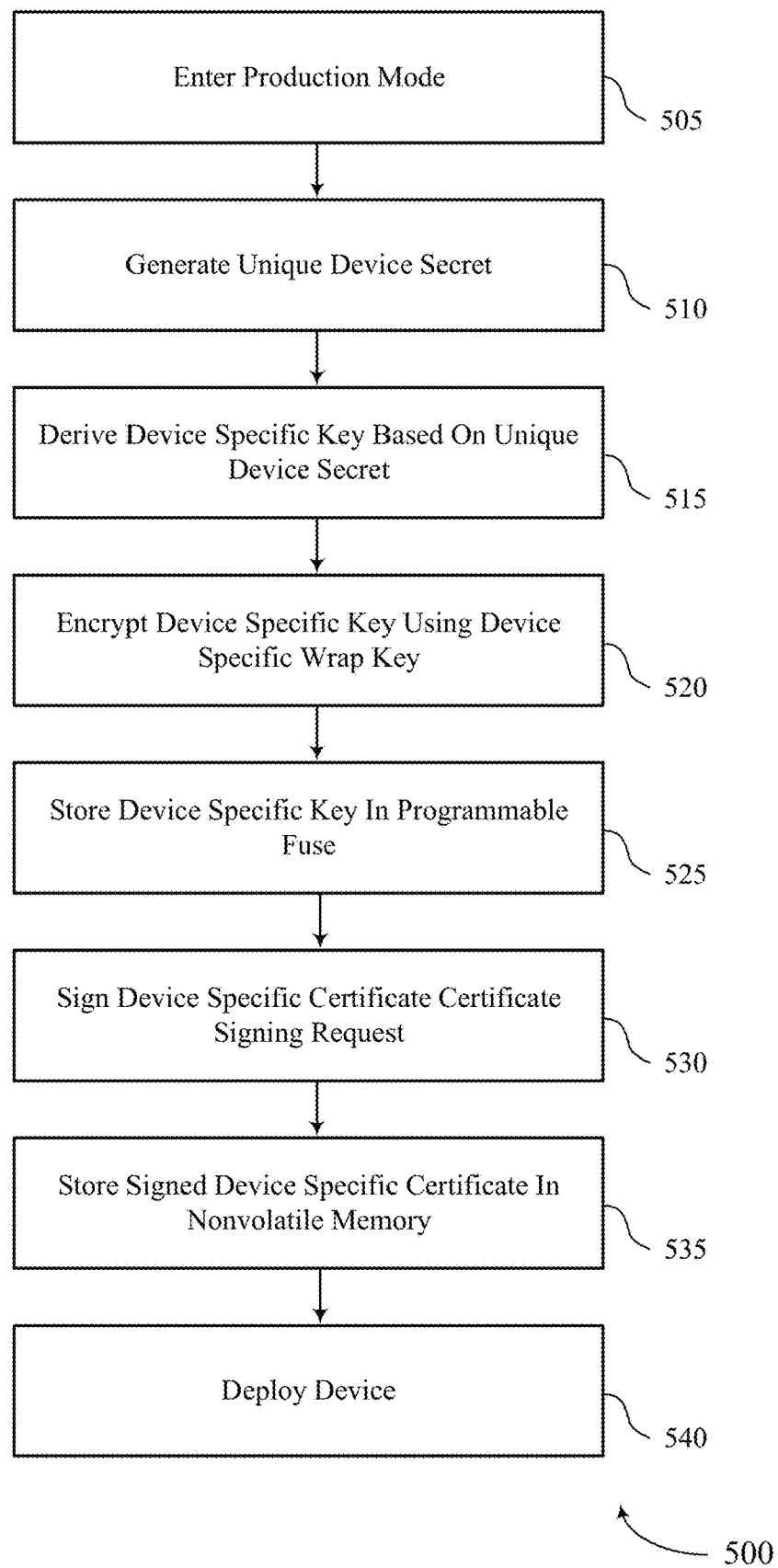
FIGS. 5 and 6 illustrate examples of methods that support techniques for managing offline identity upgrades in accordance with examples as disclosed herein.

FIG. 5 illustrates an example of a method 500 that supports techniques for managing offline identity upgrades in accordance with examples as disclosed herein. The operations of method 500 may be implemented by a host system 105 or a memory system 110 or components thereof as described herein. For example, the operations of method 500 may be performed by the host system 105 or the memory system 110 as described with reference to FIGS. 1-4. In some examples, a host system 105 or a memory system 110 may execute a set of instructions to control the functional elements of the host system 105 or the memory system 110 to perform the described operations. In some examples, some operations may be performed in a different order than the example order shown, or some operations may be performed in different orders or at different times. In some other examples, some operations may be omitted from the method 500, and other operations may be added to the method 500.

At 505, the host system 105 or the memory system 110 may enter a production mode. The production mode may include one or more of manufacturing (e.g., installing, configuration, reconfiguring, uninstalling, and the like of software, firmware, and/or hardware) components associated with the host system 105 or the memory system 110. At 510, the host system 105 or the memory system 110 may generate a UDS. At 515, the host system 105 or the memory system 110 may derive a DSK based on the UDS. At 520, the host system 105 or the memory system 110 may encrypt the DSK using a DSWK. In some examples, the host system 105 or the memory system 110 may encrypt the DSK using the DSWK and in accordance with an encryption function. At 525, the host system 105 or the memory system 110 may store the encrypted DSK in a programmable fuse (e.g., eFuse) of the host system 105 or the memory system 110. At 530, the host system 105 or the memory system 110 may sign a DSC CSR. At 535, the host system 105 or the memory system 110 may store the signed DSC. At 540, the host system 105 or the memory system 110 may be deployed.

Figure 6:
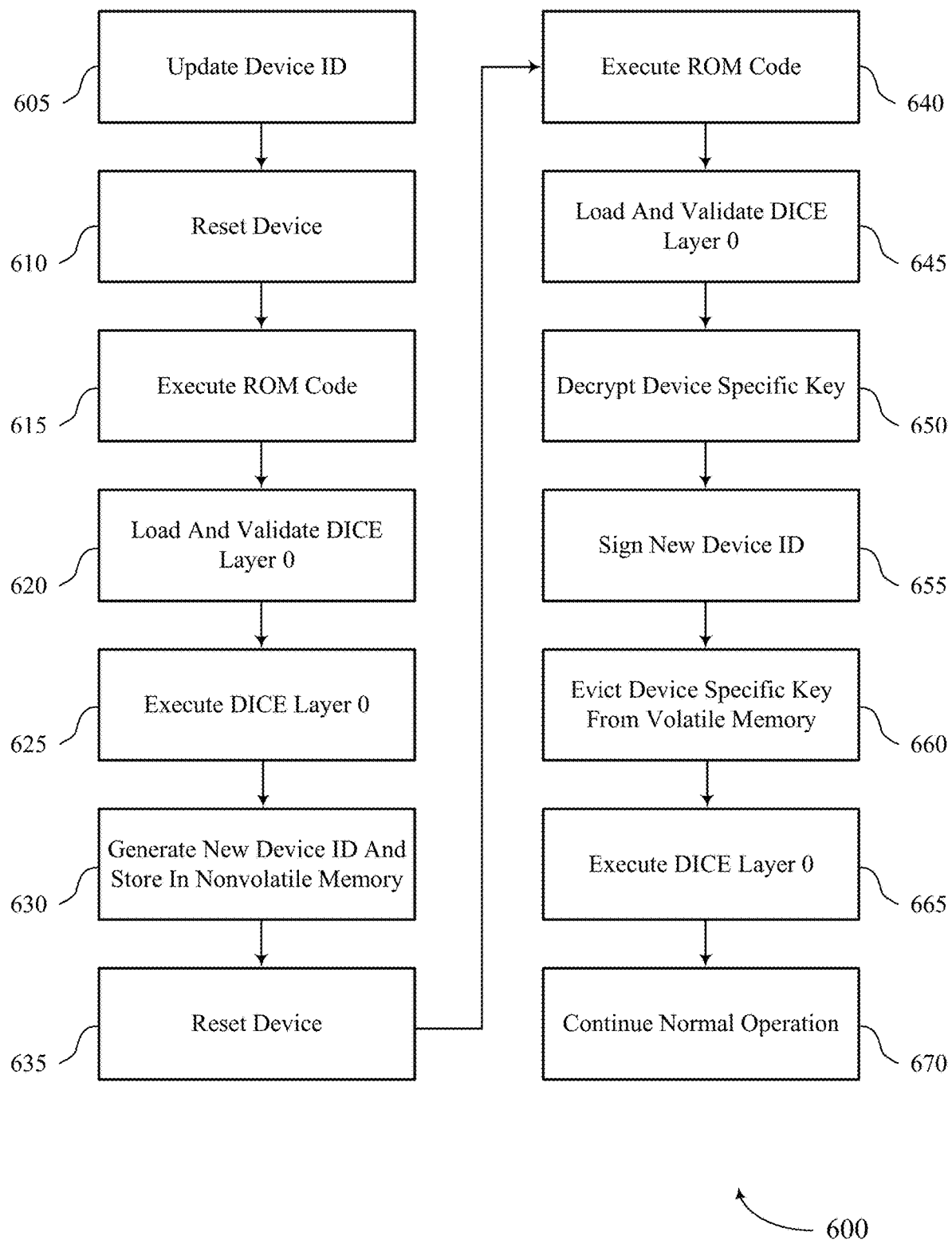

FIG. 6 illustrates an example of a method 600 that supports techniques for managing offline identity upgrades in accordance with examples as disclosed herein. The operations of method 600 may be implemented by a host system 105 or a memory system 110 or components thereof as described herein. For example, the operations of method 600 may be performed by the host system 105 or the memory system 110 as described with reference to FIGS. 1-4. In some examples, a host system 105 or a memory system 110 may execute a set of instructions to control the functional elements of the host system 105 or the memory system 110 to perform the described operations. In some examples, some operations may be performed in a different order than the example order shown, or some operations may be performed in different orders or at different times. In some other examples, some operations may be omitted from the method 500, and other operations may be added to the method 600.

At 605, the host system 105 or the memory system 110 may update a device ID. For example, the host system 105 or the memory system 110 may receive a command to update a device identifier for a DICE associated with a memory system. At 610, the host system 105 or the memory system 110 may reset the host system 105 or the memory system 110. At 615, the host system 105 or the memory system 110 may execute a ROM code. At 620, the host system 105 or the memory system 110 may load and validate a DICE Layer 0. At 625, the host system 105 or the memory system 110 may execute the DICE Layer 0. At 630, the host system 105 or the memory system 110 may generate a new device ID and store in a nonvolatile memory, for example, ROM, among other examples. At 635, the host system 105 or the memory system 110 may rest the host system 105 or the memory system 110. At 640, the host system 105 or the memory system 110 may execute a ROM code. At 645, the host system 105 or the memory system 110 may load and validate a DICE Layer 0.

At 650, the host system 105 or the memory system 110 may decrypt a DSK. The DSK may be an asymmetric key. An asymmetric cryptographic process may use a pair of keys (e.g., a public key and a private key) to encrypt and decrypt information and protect the information for unauthorized access or use. For example, a first key may be used to encrypt the information and a second key may be used to decrypt the information. The DSK may be an example of one of the keys of a pair of keys in an asymmetric cryptographic process. In some examples, the DSK may be encrypted using a DSWK as described herein. The DSWK may be a symmetric key used to encrypt and decrypt the DSK as described herein. A symmetric cryptographic process may use a single key to encrypt and decrypt information. At 655, the host system 105 or the memory system 110 may sign the new device ID. For example, the host system 105 or the memory system 110 may sign the new device ID based on the decrypted DSK. At 660, the host system 105 or the memory system 110 may evict the DSK from volatile memory before additional operations are performed. Ensuring that the DSK is evicted from volatile memory may help protect the DSK from being accessed by unauthorized users. For example, the host system 105 or the memory system 110 may evict the DSK from an SRAM associated with the host system 105 or the memory system 110. At 665, the host system 105 or the memory system 110 may execute the DICE Layer 0. At 670, the host system 105 or the memory system 110 may continue normal operations.

Figure 7:
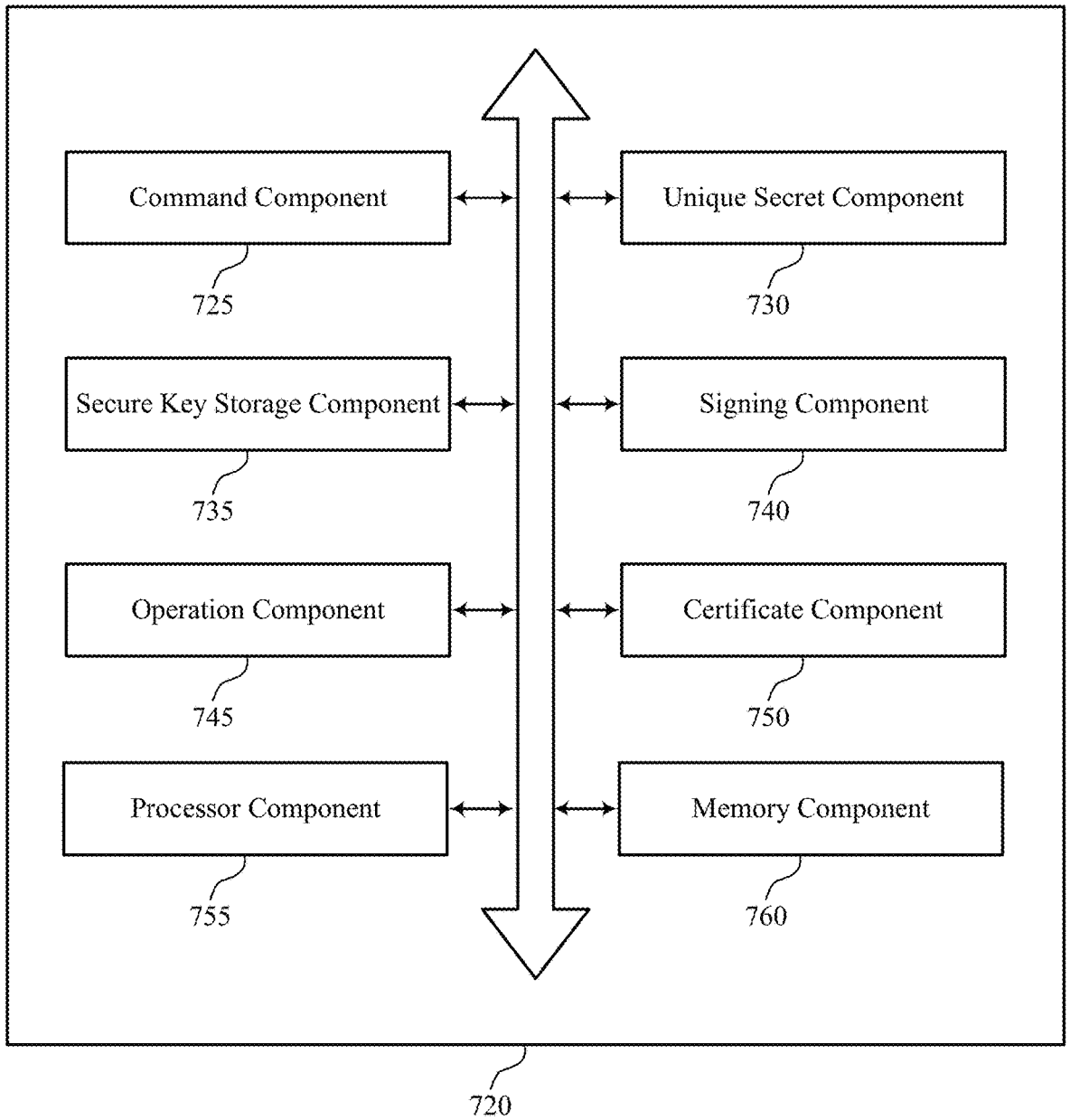
FIG. 7 shows a block diagram of a memory system that supports techniques for managing offline identity upgrades in accordance with examples as disclosed herein.

FIG. 7 shows a block diagram 700 of a memory system 720 that supports techniques for managing offline identity upgrades in accordance with examples as disclosed herein. The memory system 720 may be an example of aspects of a memory system as described with reference to FIGS. 1-6. The memory system 720, or various components thereof, may be an example of means for performing various aspects of techniques for managing offline identity upgrades as described herein. For example, the memory system 720 may include a command component 725, a unique secret component 730, a secure key storage component 735, a signing component 740, an operation component 745, a certificate component 750, a processor component 755 (e.g., a cryptographic processor component), a memory component 760 (e.g., a public non-volatile storage component), or any combination thereof. Each of these components may communicate, directly or indirectly, with one another (e.g., via one or more buses).

The command component 725 (e.g., an I/O controller) may manage input and output signals for the memory system 720. In some cases, the command component 725 may utilize an operating system such as iOS®, ANDROID®, MS-DOS®, MS-WINDOWS®, OS/2®, UNIX®, LINUX®, or another known operating system. In some cases, the command component 725 may be implemented as part of a processor, such as the processor component 755. In some cases, a user may interact with the memory system 720 via the command component 725 or via hardware components controlled by the command component 725. The command component 725 may be configured as or otherwise support a means for receiving a command to update a device identifier for a DICE associated with the memory system 720. The unique secret component 730 may be configured as or otherwise support a means for generating an updated device identifier, at a first software layer of a set of software layers of the DICE, based at least in part on receiving the command. The secure key storage component 735 may be configured as or otherwise support a means for decrypting a DSK stored at a ROM device of the memory system 720 based at least in part on the received command. The signing component 740 may be configured as or otherwise support a means for signing the updated device identifier using the DSK based at least in part on decrypting the DSK. The operation component 745 may be configured as or otherwise support a means for executing one or more operations associated with the first software layer of the set of software layers of the DICE based at least in part on the signed updated device identifier.

In some examples, the secure key storage component 735 may be configured as or otherwise support a means for generating the DSK based at least in part on a UDS associated with the memory system 720. In some examples, the secure key storage component 735 may be configured as or otherwise support a means for encrypting the DSK using a DSWK associated with the memory system 720. In some examples, the key component 735 may be configured as or otherwise support a means for decrypting the DSK based at least in part on the DSWK. In some examples, the secure key storage component 735 may be configured as or otherwise support a means for storing the encrypted DSK in the ROM device of the memory system 720, where the ROM device includes a programmable fuse.

In some examples, the DSWK includes a symmetric key used to encrypt and decrypt information. In some examples, the DSWK may be derived based on a UDS. In some examples, the secure key storage component 735 may be configured as or otherwise support a means for retrieving the DSWK from a nonvolatile memory associated with the memory system 720. In some examples, the nonvolatile memory includes ROM, erasable programmable ROM (EPROM), electrically erasable programmable ROM (EEPROM), ferroelectric random-access memory (FeRAM), magnetic random-access memory (MRAM), phase-change memory (PCM), or a combination thereof.

In some examples, the certificate component 750 may be configured as or otherwise support a means for receiving a CSR signed by a server associated with the memory system 720. In some examples, the signing component 740 may be configured as or otherwise support a means for signing a DSC based at least in part on the received CSR. In some examples, the signing component 740 may be configured as or otherwise support a means for signing the updated device identifier using the DSK based at least in part on signing the DSC. In some examples, to support signing the DSC, the signing component 740 may be configured as or otherwise support a means for signing the DSC using the decrypted DSK. In some examples, the certificate component 750 may be configured as or otherwise support a means for storing the signed DSC in a nonvolatile memory associated with the memory system 720. In some examples, the nonvolatile memory includes ROM, EPROM, EEPROM, FeRAM, MRAM, PCM, or a combination thereof.

In some examples, the DSK includes an asymmetric key pair. In some examples, the secure key storage component 735 may be configured as or otherwise support a means for removing the DSK from a volatile memory device of the memory system 720 based at least in part on signing the updated device identifier using the decrypted DSK. In some examples, the operation component 745 may be configured as or otherwise support a means for executing the one or more operations associated with the first software layer of the DICE in response to removing the DSK from the volatile memory device. In some examples, the volatile memory device includes dynamic random-access memory (DRAM) or static random access memory (SRAM), or both.

In some examples, the unique secret component 730 may be configured as or otherwise support a means for generating an updated device identifier at a first software layer of a set of software layers of a DICE associated with the memory system 720. In some examples, the signing component 740 may be configured as or otherwise support a means for signing the updated device identifier using a DSK stored at a ROM device of the memory system 720. In some examples, the operation component 745 may be configured as or otherwise support a means for executing the first software layer of the set of software layers of the DICE based at least in part on the signed updated device identifier.

In some examples, the secure key storage component 735 may be configured as or otherwise support a means for generating the DSK based at least in part on a UDS associated with the memory system 720. In some examples, the secure key storage component 735 may be configured as or otherwise support a means for encrypting the DSK using a DSWK associated with the memory system 720. In some examples, the secure key storage component 735 may be configured as or otherwise support a means for decrypting the DSK based at least in part on the DSWK. In some examples, the DSWK includes a symmetric key used to encrypt and decrypt information, and the DSWK may be derived based on a UDS. In some examples, the secure key storage component 735 may be configured as or otherwise support a means for retrieving the DSWK from a nonvolatile memory associated with the memory system 720. In some examples, the nonvolatile memory includes ROM, EPROM, EEPROM, FeRAM, MRAM, PCM, or a combination thereof.

The processor component 755 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor component 755 may be configured to operate a memory array using a memory controller. In some other cases, a memory controller may be integrated into the processor component 755. The processor component 755 may be configured to execute computer-readable instructions stored in a memory (e.g., the memory component 760) to cause the memory system 720 to perform various functions (e.g., functions or tasks supporting managing offline identity upgrades).

The memory component 760 may include RAM and ROM. The memory component 760 may store computer-readable, computer-executable code including instructions that, when executed by the processor component 755, cause the memory system 720 to perform various functions described herein. The code may be stored in a non-transitory computer-readable medium such as system memory or another type of memory. In some cases, the code may not be directly executable by the processor component 755 but may cause a computer (e.g., when compiled and executed) to perform functions described herein. In some cases, the memory component 760 may contain, among other things, a basic I/O system (BIOS) which may control basic hardware or software operation such as the interaction with peripheral components or devices.

Figure 8:
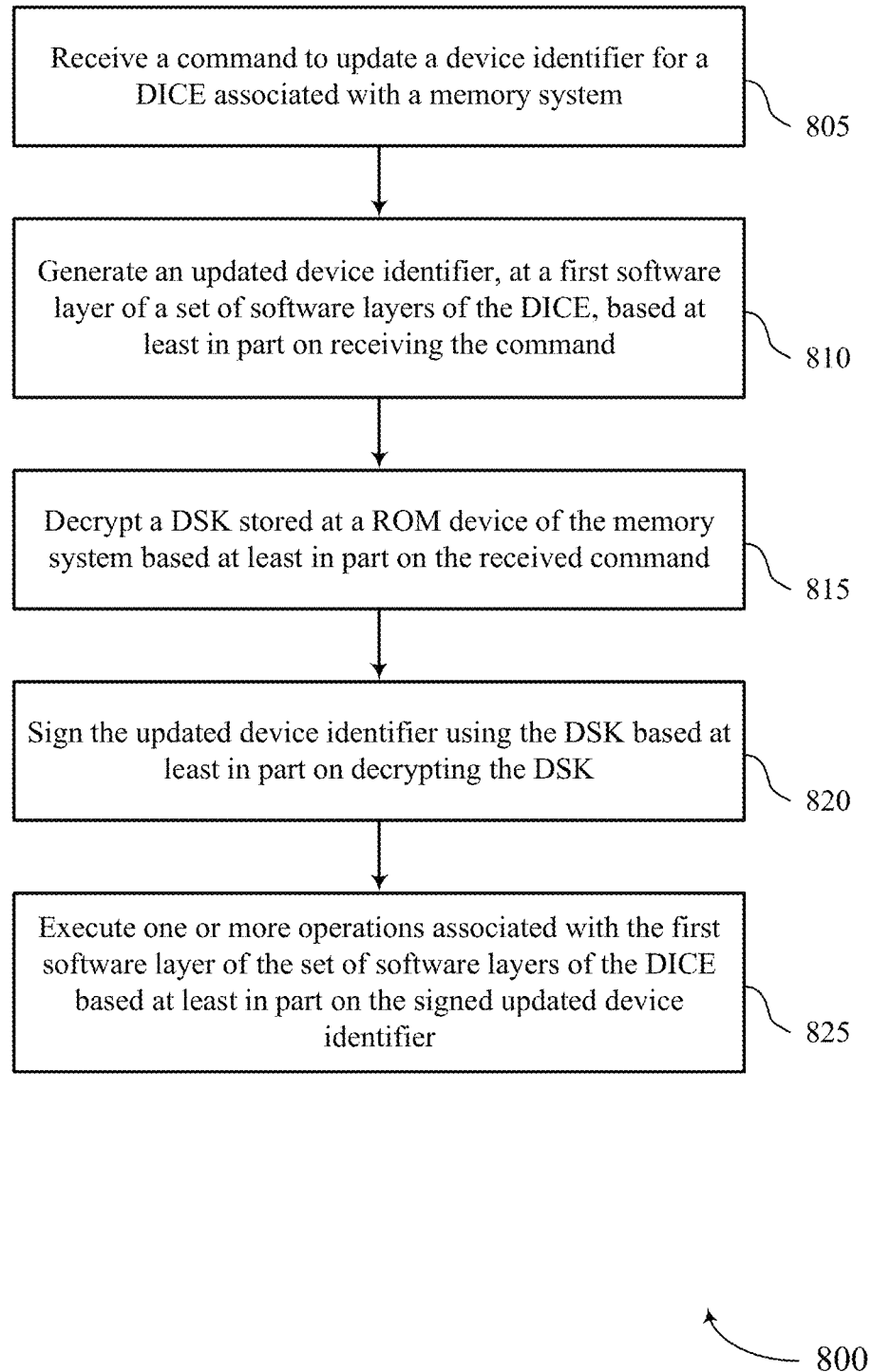
FIGS. 8 and 9 show flowcharts illustrating methods that support techniques for managing offline identity upgrades in accordance with examples as disclosed herein.

FIG. 8 shows a flowchart illustrating a method 800 that supports techniques for managing offline identity upgrades in accordance with examples as disclosed herein. The operations of method 800 may be implemented by a memory system or its components as described herein. For example, the operations of method 800 may be performed by a memory system as described with reference to FIGS. 1-7. In some examples, a memory system may execute a set of instructions to control the functional elements of the device to perform the described functions. Additionally, or alternatively, the memory system may perform aspects of the described functions using special-purpose hardware.

At 805, the method may include receiving a command to update a device identifier for a DICE associated with a memory system. The operations of 805 may be performed in accordance with examples as disclosed herein. In some examples, aspects of the operations of 805 may be performed by a command component 725 as described with reference to FIG. 7.

At 810, the method may include generating an updated device identifier, at a first software layer of a set of software layers of the DICE, based at least in part on receiving the command. The operations of 810 may be performed in accordance with examples as disclosed herein. In some examples, aspects of the operations of 810 may be performed by a unique secret component 730 as described with reference to FIG. 7.

At 815, the method may include decrypting a DSK stored at a ROM device of the memory system based at least in part on the received command. The operations of 815 may be performed in accordance with examples as disclosed herein. In some examples, aspects of the operations of 815 may be performed by a secure key storage component 735 as described with reference to FIG. 7.

At 820, the method may include signing the updated device identifier using the DSK based at least in part on decrypting the DSK. The operations of 820 may be performed in accordance with examples as disclosed herein. In some examples, aspects of the operations of 820 may be performed by a signing component 740 as described with reference to FIG. 7.

At 825, the method may include executing one or more operations associated with the first software layer of the set of software layers of the DICE based at least in part on the signed updated device identifier. The operations of 825 may be performed in accordance with examples as disclosed herein. In some examples, aspects of the operations of 825 may be performed by an operation component 745 as described with reference to FIG. 7.

In some examples, an apparatus as described herein may perform a method or methods, such as the method 800. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving a command to update a device identifier for a DICE associated with a memory system; generating an updated device identifier, at a first software layer of a set of software layers of the DICE, based at least in part on receiving the command;

decrypting a DSK stored at a ROM device of the memory system based at least in part on the received command; signing the updated device identifier using the DSK based at least in part on decrypting the DSK; and executing one or more operations associated with the first software layer of the set of software layers of the DICE based at least in part on the signed updated device identifier.

Aspect 2: The method, apparatus, or non-transitory computer-readable medium of aspect 1, further including operations, features, circuitry, logic, means, or instructions, or any combination thereof for generating the DSK based at least in part on a UDS associated with the memory system.

Aspect 3: The method, apparatus, or non-transitory computer-readable medium of any of aspects 1 through 2, further including operations, features, circuitry, logic, means, or instructions, or any combination thereof for encrypting the DSK using a DSWK associated with the memory system and where decrypting the DSK is based at least in part on the DSWK.

Aspect 4: The method, apparatus, or non-transitory computer-readable medium of aspect 3, further including operations, features, circuitry, logic, means, or instructions, or any combination thereof for storing the encrypted DSK in the ROM device of the memory system, where the ROM device includes a programmable fuse.

Aspect 5: The method, apparatus, or non-transitory computer-readable medium of any of aspects 3 through 4 where the DSWK includes a symmetric key used to encrypt and decrypt information, and the DSWK is derived based at least in part on a UDS.

Aspect 6: The method, apparatus, or non-transitory computer-readable medium of any of aspects 3 through 5, further including operations, features, circuitry, logic, means, or instructions, or any combination thereof for retrieving the DSWK from a nonvolatile memory associated with the memory system and where the nonvolatile memory includes ROM, erasable programmable ROM (EPROM), electrically erasable programmable ROM (EEPROM), ferroelectric random-access memory (FeRAM), magnetic random-access memory (MRAM), phase-change memory (PCM), or a combination thereof Aspect 7: The method, apparatus, or non-transitory computer-readable medium of any of aspects 3 through 6, further including operations, features, circuitry, logic, means, or instructions, or any combination thereof for receiving a CSR; signing a DSC based at least in part on the received CSR signed by a server associated with the memory system; and where signing the updated device identifier using the DSK is further based at least in part on signing the DSC.

Aspect 8: The method, apparatus, or non-transitory computer-readable medium of aspect 7 where signing the DSC includes operations, features, circuitry, logic, means, or instructions, or any combination thereof for signing the DSC using the decrypted DSK.

Aspect 9: The method, apparatus, or non-transitory computer-readable medium of any of aspects 7 through 8, further including operations, features, circuitry, logic, means, or instructions, or any combination thereof for storing the signed DSC in a nonvolatile memory associated with the memory system and where the nonvolatile memory includes ROM, erasable programmable ROM (EPROM), electrically erasable programmable ROM (EEPROM), ferroelectric random-access memory (FeRAM), magnetic random-access memory (MRAM), phase-change memory (PCM), or a combination thereof Aspect 10: The method, apparatus, or non-transitory computer-readable medium of any of aspects 1 through 9 where the DSK includes an asymmetric key.

Aspect 11: The method, apparatus, or non-transitory computer-readable medium of any of aspects 1 through 10, further including operations, features, circuitry, logic, means, or instructions, or any combination thereof for removing the DSK from a volatile memory device of the memory system based at least in part on signing the updated device identifier using the decrypted DSK and where executing the one or more operations associated with the first software layer of the DICE occurs in response to removing the DSK from the volatile memory device.

Aspect 12: The method, apparatus, or non-transitory computer-readable medium of aspect 11 where the volatile memory device includes DRAM or SRAM, or both.

Figure 9:
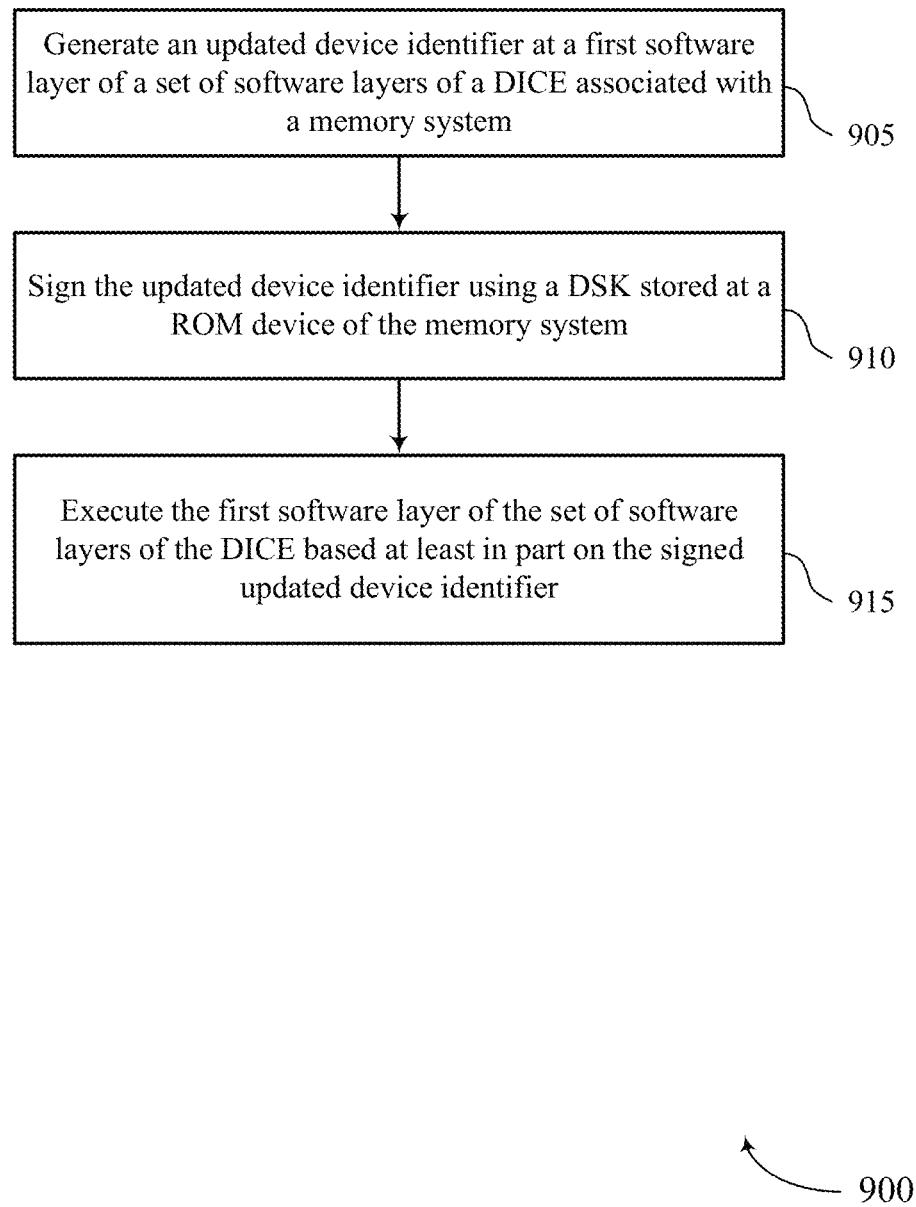

FIG. 9 shows a flowchart illustrating a method 900 that supports techniques for managing offline identity upgrades in accordance with examples as disclosed herein. The operations of method 900 may be implemented by a memory system or its components as described herein. For example, the operations of method 900 may be performed by a memory system as described with reference to FIGS. 1-7. In some examples, a memory system may execute a set of instructions to control the functional elements of the device to perform the described functions. Additionally, or alternatively, the memory system may perform aspects of the described functions using special-purpose hardware.

At 905, the method may include generating an updated device identifier at a first software layer of a set of software layers of a DICE associated with a memory system. The operations of 905 may be performed in accordance with examples as disclosed herein. In some examples, aspects of the operations of 905 may be performed by a unique secret component 730 as described with reference to FIG. 7.

At 910, the method may include signing the updated device identifier using a DSK stored at a ROM device of the memory system. The operations of 910 may be performed in accordance with examples as disclosed herein. In some examples, aspects of the operations of 910 may be performed by a signing component 740 as described with reference to FIG. 7.

At 915, the method may include executing the first software layer of the set of software layers of the DICE based at least in part on the signed updated device identifier. The operations of 915 may be performed in accordance with examples as disclosed herein. In some examples, aspects of the operations of 915 may be performed by an operation component 745 as described with reference to FIG. 7.

In some examples, an apparatus as described herein may perform a method or methods, such as the method 900. The apparatus may include features, circuitry, logic, means, or instructions (e.g., a non-transitory computer-readable medium storing instructions executable by a processor), or any combination thereof for performing the following aspects of the present disclosure:

Aspect 13: A method, apparatus, or non-transitory computer-readable medium including operations, features, circuitry, logic, means, or instructions, or any combination thereof for generating an updated device identifier at a first software layer of a set of software layers of a DICE associated with a memory system; signing the updated device identifier using a DSK stored at a ROM device of the memory system; and executing the first software layer of the set of software layers of the DICE based at least in part on the signed updated device identifier.

Aspect 14: The method, apparatus, or non-transitory computer-readable medium of aspect 13, further including operations, features, circuitry, logic, means, or instructions, or any combination thereof for generating the DSK based at least in part on a UDS associated with the memory system.

Aspect 15: The method, apparatus, or non-transitory computer-readable medium of any of aspects 13 through 14, further including operations, features, circuitry, logic, means, or instructions, or any combination thereof for encrypting the DSK using a DSWK associated with the memory system and decrypting the DSK is based at least in part on the DSWK.

Aspect 16: The method, apparatus, or non-transitory computer-readable medium of aspect 15 where the DSWK includes a symmetric key used to encrypt and decrypt information, and the DSWK is derived based at least in part on a UDS.

Aspect 17: The method, apparatus, or non-transitory computer-readable medium of any of aspects 15 through 16, further including operations, features, circuitry, logic, means, or instructions, or any combination thereof for retrieving the DSWK from a nonvolatile memory associated with the memory system and where the nonvolatile memory includes ROM, EPROM, EEPROM, FeRAM, MRAM, PCM, or a combination thereof.

It should be noted that the described techniques include possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 18: An apparatus, including: a memory system; and a controller coupled with the memory system and configured to: receive a command to update a device identifier for a DICE associated with the memory system; generate an updated device identifier, at a first software layer of a set of software layers of the DICE, based at least in part on receiving the command; decrypt a DSK stored at a ROM device of the memory system based at least in part on the received command; sign the updated device identifier using the DSK based at least in part on decrypting the DSK; and execute one or more operations associated with the first software layer of the set of software layers of the DICE based at least in part on the signed updated device identifier.

Aspect 19: The apparatus of aspect 18, where the controller is further configured to: generate the DSK based at least in part on a UDS associated with the memory system.

Aspect 20: The apparatus of any of aspects 18 through 19, where the controller is further configured to: encrypt the DSK using a DSWK associated with the memory system, where to decrypt the DSK is further based at least in part on the DSWK.

Aspect 21: The apparatus of aspect 20, where the controller is further configured to: store the encrypted DSK in the ROM device of the memory system, where the ROM device includes a programmable fuse.

Aspect 22: The apparatus of any of aspects 20 through 21, where the DSWK includes a symmetric key used to encrypt and decrypt information, and the DSWK is derived based at least in part on a UDS.

Aspect 23: The apparatus of any of aspects 20 through 22, where the controller is further configured to: retrieve the DSWK from a nonvolatile memory associated with the memory system, where the nonvolatile memory includes ROM, EPROM, EEPROM, FeRAM, MRAM, PCM, or a combination thereof Aspect 24: The apparatus of any of aspects 20 through 23, where the controller is further configured to: receive a CSR signed by a server associated with the memory system; and sign a DSC based at least in part on the received CSR, where to sign the updated device identifier using the DSK is further based at least in part on signing the DSC.

Aspect 25: The apparatus of aspect 24, where, to sign the DSC, the controller is configured to: sign the DSC using the decrypted DSK.

Aspect 26: The apparatus of any of aspects 24 through 25, where the controller is further configured to: store the signed DSC in a nonvolatile memory associated with the memory system, where the nonvolatile memory includes ROM, EPROM, EEPROM, FeRAM, MRAM, PCM, or a combination thereof Aspect 27: The apparatus of any of aspects 18 through 26, where the DSK includes an asymmetric key.

Aspect 28: The apparatus of any of aspects 18 through 27, where the controller is further configured to: remove the DSK from a volatile memory device of the memory system based at least in part on signing the updated device identifier using the decrypted DSK, where to execute the one or more operations associated with the first software layer of the set of software layers of the DICE occurs in response to removing the DSK from the volatile memory device.

Aspect 29: The apparatus of aspect 28, where the volatile memory device includes DRAM or SRAM, or both.

An apparatus is described. The following provides an overview of aspects of the apparatus as described herein:

Aspect 30: An apparatus, including: a memory system; and a controller coupled with the memory system and configured to: generate an updated device identifier, at a first software layer of a set of software layers of a DICE associated with the memory system; sign the updated device identifier using a DSK stored at a ROM device of the memory system; and execute one or more operations associated with the first software layer of the set of software layers of the DICE based at least in part on the signed updated device identifier.

Aspect 31: The apparatus of aspect 30, where the controller is further configured to: generate the DSK based at least in part on a UDS associated with the memory system.

Aspect 32: The apparatus of any of aspects 30 through 31, where the controller is further configured to: encrypt the DSK using a DSWK associated with the memory system; and decrypt the DSK based at least in part on the DSWK.

Aspect 33: The apparatus of aspect 32, where the DSWK includes a symmetric key used to encrypt and decrypt information, and the DSWK is derived based at least in part on a UDS.

Aspect 34: The apparatus of any of aspects 32 through 33, where the controller is further configured to: retrieve the DSWK from a nonvolatile memory associated with the memory system, where the nonvolatile memory includes ROM, EPROM, EEPROM, FeRAM, MRAM, PCM, or a combination thereof.

An apparatus is described. The following provides an overview of aspects of the apparatus as described herein:

Aspect 35: An apparatus, including: a memory system; a DICE coupled with the memory system, the DICE including a set of software layers; and a controller coupled with the DICE, the controller configured to: receive a command to update a device identifier for a DICE associated with the memory system; generate an updated device identifier, at a first software layer of the set of software layers of the DICE, based at least in part on receiving the command; decrypt a DSK stored at a ROM device of the memory system based at least in part on the received command; sign the updated device identifier using the DSK based at least in part on decrypting the DSK; and execute one or more operations associated with the first software layer of the set of software layers of the DICE based at least in part on the signed updated device identifier.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
receiving a command to update a device identifier for a device identifier composition engine associated with a memory system, the memory system being associated with a device specific key, a device identifier key, and an alias key;
generating an updated device identifier, at a first software layer of a set of software layers of the device identifier composition engine, based at least in part on receiving the command;
decrypting the device specific key stored at a read-only memory device of the memory system based at least in part on the received command;
signing a device specific certificate using the device specific key based at least in part on decrypting the device specific key;
signing the updated device identifier using the device specific key based at least in part on signing the device specific certificate; and
executing one or more operations associated with the first software layer of the set of software layers of the device identifier composition engine based at least in part on the signed updated device identifier.

2. The method of claim 1, further comprising:
generating the device specific key based at least in part on a unique device secret associated with the memory system.

3. The method of claim 1, further comprising:
encrypting the device specific key using a device specific wrap key associated with the memory system,
wherein decrypting the device specific key is based at least in part on the device specific wrap key.

4. The method of claim 3, further comprising:
storing the encrypted device specific key in the read-only memory device of the memory system, wherein the read-only memory device comprises a programmable fuse.

5. The method of claim 3, wherein the device specific wrap key comprises a symmetric key used to encrypt and decrypt information.

6. The method of claim 3, further comprising:
retrieving the device specific wrap key from a nonvolatile memory associated with the memory system,
wherein the nonvolatile memory comprises read-only memory (ROM), erasable programmable ROM (EPROM), electrically erasable programmable ROM (EEPROM), ferroelectric random-access memory (Fe-RAM), magnetic random-access memory (MRAM), phase-change memory (PCM), or a combination thereof.

7. The method of claim 3, further comprising:
receiving a certificate signing request signed by a server associated with the memory system, wherein signing the device specific certificate is based at least in part on the received certificate signing request.

8. The method of claim 1, further comprising:
signing the device specific certificate using the decrypted device specific key.

9. The method of claim 7, further comprising:
storing the signed device specific certificate in a nonvolatile memory associated with the memory system,
wherein the nonvolatile memory comprises read-only memory (ROM), erasable programmable ROM (EPROM), electrically erasable programmable ROM (EEPROM), ferroelectric random-access memory (Fe-RAM), magnetic random-access memory (MRAM), phase-change memory (PCM), or a combination thereof.

10. The method of claim 1, wherein the device specific key comprises an asymmetric key.

11. The method of claim 1, further comprising:
removing the device specific key from a volatile memory device of the memory system based at least in part on signing the updated device identifier using the decrypted device specific key,
wherein executing the one or more operations associated with the first software layer of the device identifier composition engine occurs in response to removing the device specific key from the volatile memory device.

12. The method of claim 11, wherein the volatile memory device comprises dynamic random access memory (DRAM) or static random access memory (SRAM), or both.

13. A memory system, comprising:
one or more memory devices; and
processing circuitry coupled with the one or more memory devices and configured to cause the memory system to:
receive a command to update a device identifier for a device identifier composition engine associated with the memory system, the memory system being associated with a device specific key, a device identifier key, and an alias key;
generate an updated device identifier, at a first software layer of a set of software layers of the device identifier composition engine, based at least in part on receiving the command;
decrypt the device specific key stored at a read-only memory device of the one or more memory devices based at least in part on the received command;
sign a device specific certificate using the device specific key based at least in part on decrypting the device specific key;
sign the updated device identifier using the device specific key based at least in part on signing the device specific certificate; and
execute one or more operations associated with the first software layer of the set of software layers of the device identifier composition engine based at least in part on the signed updated device identifier.

14. The memory system of claim 13, wherein the processing circuitry is further configured to cause the memory system to:
generate the device specific key based at least in part on a unique device secret associated with the memory system.

15. The memory system of claim 13, wherein the processing circuitry is further configured to cause the memory system to:
encrypt the device specific key using a device specific wrap key associated with the memory system,
wherein to decrypt the device specific key is further based at least in part on the device specific wrap key.

16. The memory system of claim 15, wherein the processing circuitry is further configured to cause the memory system to:
store the encrypted device specific key in the read-only memory device, wherein the read-only memory device comprises a programmable fuse.

17. The memory system of claim 15, wherein the device specific wrap key comprises a symmetric key used to encrypt and decrypt information.

18. The memory system of claim 15, wherein the processing circuitry is further configured to cause the memory system to:
retrieve the device specific wrap key from a nonvolatile memory associated with the memory system,
wherein the nonvolatile memory comprises read-only memory (ROM), erasable programmable ROM (EPROM), electrically erasable programmable ROM (EEPROM), ferroelectric random-access memory (Fe-RAM), magnetic random-access memory (MRAM), phase-change memory (PCM), physical unclonable function (PUF), or a combination thereof.

19. The memory system of claim 15, wherein the processing circuitry is further configured to cause the memory system to:
receive a certificate signing request signed by a server associated with the memory system, wherein signing the device specific certificate is based at least in part on the received certificate signing request.

20. The memory system of claim 13, wherein the processing circuitry is further configured to cause the memory system to:

sign the device specific certificate using the decrypted device specific key.

21. The memory system of claim 19, wherein the processing circuitry is further configured to cause the memory system to:
store the signed device specific certificate in a nonvolatile memory associated with the memory system,
wherein the nonvolatile memory comprises read-only memory (ROM), erasable programmable ROM (EPROM), electrically erasable programmable ROM (EEPROM), ferroelectric random-access memory (FeRAM), magnetic random-access memory (MRAM), phase-change memory (PCM), or a combination thereof.

22. The memory system of claim 13, wherein the device specific key comprises an asymmetric key.

23. The memory system of claim 13, wherein the processing circuitry is further configured to cause the memory system to:
remove the device specific key from a volatile memory device of the one or more memory devices based at least in part on signing the updated device identifier,
wherein to execute the one or more operations associated with the first software layer of the set of software layers of the device identifier composition engine occurs in response to removing the device specific key from the volatile memory device.

24. The memory system of claim 23, wherein the volatile memory device comprises dynamic random access memory (DRAM) or static random access memory (SRAM), or both.

25. A method, comprising:
generating an updated device identifier at a first software layer of a set of software layers of a device identifier composition engine associated with a memory system, the memory system being associated with a device specific key, a device identifier key, and an alias key;
signing a device specific certificate using the device specific key, the device specific key stored at a read-only memory device of the memory system;
signing the updated device identifier using the device specific key based at least in part on signing the device specific certificate; and
executing one or more operations associated with the first software layer of the set of software layers of the device identifier composition engine based at least in part on the signed updated device identifier.

26. The method of claim 25, further comprising:
generating the device specific key based at least in part on a unique device secret associated with the memory system.

27. The method of claim 25, further comprising:
encrypting the device specific key using a device specific wrap key associated with the memory system; and
decrypting the device specific key is based at least in part on the device specific wrap key.

28. The method of claim 27, wherein the device specific wrap key comprises a symmetric key used to encrypt and decrypt information, and wherein the device specific wrap key is derived based at least in part on a unique device secret.

29. The method of claim 27, further comprising:
retrieving the device specific wrap key from a nonvolatile memory associated with the memory system,
wherein the nonvolatile memory comprises read-only memory (ROM), erasable programmable ROM (EPROM), electrically erasable programmable ROM (EEPROM), ferroelectric random-access memory (FeRAM), magnetic random-access memory (MRAM), phase-change memory (PCM), or a combination thereof.

30. A memory system, comprising:
one or more memory devices; and
processing circuitry coupled with the one or more memory devices and configured to cause the memory system to:
generate an updated device identifier, at a first software layer of a set of software layers of a device identifier composition engine associated with the memory system, the memory system being associated with a device specific key, a device identifier key, and an alias key;
sign a device specific certificate using the device specific key, the device specific key stored at a read-only memory device of the one or more memory devices;
sign the updated device identifier using the device specific key based at least in part on signing the device specific certificate; and
execute one or more operations associated with the first software layer of the set of software layers of the device identifier composition engine based at least in part on the signed updated device identifier.

31. The memory system of claim 30, wherein the processing circuitry is further configured to cause the memory system to:
generate the device specific key based at least in part on a unique device secret associated with the memory system.

32. The memory system of claim 30, wherein the processing circuitry is further configured to cause the memory system to:
encrypt the device specific key using a device specific wrap key associated with the memory system; and
decrypt the device specific key based at least in part on the device specific wrap key.

33. The memory system of claim 32, wherein the device specific wrap key comprises a symmetric key used to encrypt and decrypt information.

34. The memory system of claim 32, wherein the processing circuitry is further configured to cause the memory system to:
retrieve the device specific wrap key from a nonvolatile memory associated with the memory system,
wherein the nonvolatile memory comprises read-only memory (ROM), erasable programmable ROM (EPROM), electrically erasable programmable ROM (EEPROM), ferroelectric random-access memory (FeRAM), magnetic random-access memory (MRAM), phase-change memory (PCM), or a combination thereof.

35. A memory system, comprising:
one or more memory devices;
a device identifier composition engine coupled with the one or more memory devices, the device identifier composition engine comprising a set of software layers; and
processing circuitry coupled with the device identifier composition engine, the processing circuitry configured to cause the memory system to:
receive a command to update a device identifier for the device identifier composition engine associated with the memory system, the memory system being associated with a device specific key, a device identifier key, and an alias key;

generate an updated device identifier, at a first software layer of the set of software layers of the device identifier composition engine, based at least in part on receiving the command;

decrypt the device specific key stored at a read-only memory device of the one or more memory devices based at least in part on the received command;

sign a device specific certificate using the device specific key based at least in part on decrypting the device specific key;

sign the updated device identifier using the device specific key based at least in part on signing the device specific certificate; and execute one or more operations associated with the first software layer of the set of software layers of the device identifier composition engine based at least in part on the signed updated device identifier.

\* \* \* \* \*